United States Patent
Tulet et al.

(10) Patent No.: US 9,534,893 B2
(45) Date of Patent: Jan. 3, 2017

(54) IMAGING MACHINE WITH SEVERAL DETECTOR ARRAYS AND FILTERS WITH DIFFERENT SPECTRAL TRANSMISSION WINDOWS ARRANGED IN A FOCAL PLANE

(71) Applicant: ASTRIUM SAS, Suresnes (FR)

(72) Inventors: Michel Tulet, Balma (FR); Gilles Planche, Aigrefeuille (FR)

(73) Assignee: Airbus Defence and Space, Les Mureaux (FR)

( * ) Notice: Subject to any disclaimer, the term of this patent is extended or adjusted under 35 U.S.C. 154(b) by 520 days.

(21) Appl. No.: 14/086,006

(22) Filed: Nov. 21, 2013

(65) Prior Publication Data

US 2014/0211006 A1  Jul. 31, 2014

(30) Foreign Application Priority Data

Nov. 21, 2012 (FR) .................... 12 03131

(51) Int. Cl.
| | |
|---|---|
| H01L 27/146 | (2006.01) |
| G01C 11/02 | (2006.01) |
| G01J 3/28 | (2006.01) |
| G02B 27/10 | (2006.01) |
| H04N 3/14 | (2006.01) |
| H04N 5/232 | (2006.01) |
| H04N 9/04 | (2006.01) |
| H04N 13/02 | (2006.01) |

(52) U.S. Cl.
CPC .............. *G01C 11/02* (2013.01); *G01J 3/2803* (2013.01); *G02B 27/1013* (2013.01); *G02B 27/1066* (2013.01); *H04N 3/1581* (2013.01); *H04N 5/23245* (2013.01); *H04N 9/045* (2013.01); *H04N 13/0214* (2013.01); *H04N 13/0217* (2013.01)

(58) Field of Classification Search
CPC ............... H01L 27/14621; H04N 1/00023; H04N 5/332; G01C 11/02
USPC ............. 250/208.1, 216, 239, 226, 231.13; 244/3.16–3.18; 356/139.1, 451, 456
See application file for complete search history.

(56) References Cited

U.S. PATENT DOCUMENTS 4,663,656 A * 5/1987 Elabd ............... H01L 27/14856
257/229

OTHER PUBLICATIONS

French Preliminary Search Report from related Application FR 1203131, dated Jul. 9, 2013, 1 pg.
(Continued)

*Primary Examiner* — Que T Le
(74) *Attorney, Agent, or Firm* — Patterson Thuente Pedersen, P.A.

(57) ABSTRACT

An imaging device intended to be placed on board a satellite or an aircraft comprises at least two detector arrays that are arranged in the same focal plane. Each detector array itself comprises a unidirectional detector and at least one additional detector, produced on one same single-piece substrate dedicated to said detector array. The arrangement of the detectors in the focal plane is then carried out in a modular fashion, by positioning the respective substrates of the detector arrays. Several arrangements are proposed that are compatible with the unidirectional and bidirectional push-broom scanning modes.

23 Claims, 7 Drawing Sheets

(56) References Cited

OTHER PUBLICATIONS

Miller, James, et al., "Hyperspectral and multispectral sensors for remote sensing", SPIE, vol. 7857, Oct. 12, 2010, 9 pgs.
Rienstra, Jeffrey, et al., "Multispectral Focal Plane Assembly for Satellite Remote Sensing", IEEE, vol. 5, Mar. 21, 1998, pp. 233-241.
Updike, Todd, et al., "Radiometric use of World View-2 Imagery", DigitalGlobe, Nov. 1, 2010, pp. 1-16.

* cited by examiner

IMAGING MACHINE WITH SEVERAL DETECTOR ARRAYS AND FILTERS WITH DIFFERENT SPECTRAL TRANSMISSION WINDOWS ARRANGED IN A FOCAL PLANE

PRIORITY CLAIM

The present application claims priority to French Application FR 1203131, filed Nov. 21, 2012, said application being hereby incorporated by reference herein in its entirety.

FIELD OF THE INVENTION

The present invention relates to an imaging device with several detector arrays arranged in the same focal plane.

BACKGROUND OF THE INVENTION

The design of an imaging device for a space observation mission depends on the objectives of the mission, as well as the orbit of the satellite or the altitude of the aircraft carrying the device.

For example, observation of the Earth from a satellite in low circular orbit can be carried out during one single pass of the satellite within several adjacent strips parallel to the direction of travel of the satellite. By low orbit is meant an orbit for which the altitude of the satellite is comprised between 400 km (kilometers) and 1,000 km. Each observation strip is called a sub-swath in the jargon of a person skilled in the art. It corresponds approximately to a row of photosensitive elements of one or more detector(s) that is (are) used at the same moment to capture the image of an across-track segment of the sub-swath.

The total scan then results from a combination of the continuous acquisition of images within along-track segments of sub-swaths, and across-track offsets of the line of sight in order to swap from one sub-swath to another. Such a scanning mode is called "push-broom", and makes it possible to capture as an image an entire strip of the Earth's surface, called a swath, the width of which is approximately equal to that of a sub-swath, multiplied by the number of sub-swaths. In this manner, a swath width of 20 to 30 km can be obtained with a resolution on the ground ("ground sampling distance" or GSD) that is less than 1 m (meter), for example of the order of 0.5 m.

According to a first push-broom scanning mode, image acquisition for two along-track segments of sub-swaths that are covered one after another is carried out in the same direction of scanning. Said direction of scanning is thus the direction of travel of the satellite. Said first mode, known as "unidirectional push-broom" mode and shown in FIG. 1a, requires controlling rapid backward movements of the line of sight of the imaging device, between the successive acquisitions of two along-track segments of different sub-swaths.

A second scanning mode consists of covering successively acquired along-track segments of sub-swaths in opposite directions. Said second scanning mode, shown in FIG. 1b, is known as "bidirectional push-broom" mode. It makes it possible to reduce the dead time between the successive acquisitions of along-track segments of different sub-swaths, as the line of sight then describes a series of out-and-back movements parallel to the direction of travel of the satellite. Each period of dead time now corresponds only to the across-track shift of the line of sight from one sub-swath to the next, and to the reversal of the direction of scanning.

In FIGS. 1a and 1b, the references used have the following meanings:
S: satellite carrying the imaging device
100 imaging optics of the imaging device
$A_{100}$ line of sight of the imaging optics
PF focal plane of the imaging optics
L rows of photosensitive elements in the focal plane
DL direction of the rows of photosensitive elements
F: swath on the surface of the earth
B: image capture scanning in the entire swath
F1-F5: sub-swaths
V: direction of scan in progress of an along-track segment of sub-swath, identified in the rest of the description by the direction of image motion in the focal plane.

The across-track offsets of the line of sight as well as any reversals of the direction of scanning can be executed in different ways known to a person skilled in the art. For example, they can be carried out using an orientable mirror arranged in front of the input of the imaging optics 100, or by varying the attitude of the satellite S in a manner synchronized with its travel in the orbit.

FIGS. 1a and 1b also show the orientation of the rows L of photosensitive elements in the focal plane PF. For the two push-broom scanning modes, unidirectional and bidirectional, the attitude of the satellite S is adjusted so that the rows L of photosensitive elements are perpendicular to the along-track direction of the swath F, the latter being parallel to the ground track of the orbit of the satellite S. As a result, the photosensitive elements of one same row L simultaneously receive the luminous fluxes originating from point sources of one same across-track segment of sub-swath.

Apart from the resolution and the swath width, the specification for an observation mission also comprises constraints on the following aspects: the duration of accumulation for each image point, the acquisition of image data simultaneously for several different wavelengths, the cost and weight of the imaging device, the positioning in relation to each other of all the detectors used, etc.

Implementing time-delay integration (TDI) detectors makes it possible to use a size of photosensitive elements that is small enough to obtain a fine ground sampling distance, with a total integration time that is itself compatible with low luminous flux levels. But image detectors of the TDI type in principle can only operate for sub-swath scanning, which is carried out so that the image moves on the detector in the row transfer direction of TDI operation. It is therefore not possible to use a single TDI detector in bidirectional push-broom scanning mode, if said TDI detector has one single row transfer direction.

The imaging device WorldView-2 made by DigitalGlobe solves this incompatibility between the unidirectional nature of most existing TDI detectors and the bidirectional push-broom scanning mode. To this end, the WorldView-2 device uses only TDI detectors which each has two possible row transfer directions that are opposite to each other. FIG. 2 shows the arrangement of the image detectors in the focal plane PF which was adopted for the WorldView-2 device. Two parallel rows of TDI detectors that are allocated to a panchromatic imaging channel with a broad transmission window and denoted by the reference 1 are arranged in the focal plane PF of the device, with parallel row transfer directions. Each TDI detector of the panchromatic channel can therefore be activated regardless of the sub-swath scanning direction. Additional detectors 2a-2h are each formed of a row of photosensitive elements. They are also of the TDI type with two possible row transfer directions. All the detectors 2a are combined with narrow spectral width filters around a first colour, those marked 2b with even narrower spectral width filters around a second colour, and so on for the detectors 2c-2h. The WorldView-2 imaging device thus combines obtaining a polychromatic image, i.e. capture with a broader spectral width, with eight so-called chromatic channels, i.e. with smaller spectral widths than the panchromatic channel, and with a fine ground sampling distance, produced by the panchromatic channel. The base pattern of the arrangement of the detectors is contained within the box in broken lines C. It is repeated along the direction of the rows of photosensitive elements, in order to increase the sub-swath width. The overlaps in the direction of the rows for detectors of the same type, and their offset in the perpendicular direction, make it possible to overcome a difficulty in respect of the space requirement within the focal plane PF, and to join the segments of image lines that are captured by different detectors.

Due to the row transfer in two directions that is used for the TDI detectors 1 of the panchromatic channel, each detector is produced on a different substrate, separate from that of the neighbouring detectors 1 or 2a-2h. Each detector 1 has two transfer registers and corresponding arrays of outputs of the detection signals that are situated at opposite ends of the columns of photosensitive elements of said detectors. The resulting space requirement for the connections of outputs of the detectors 1 of the panchromatic channel then prevents the production of one of said detectors 1 on a substrate common with some of the detectors 2a-2h of the chromatic channels.

For this reason, the WorldView-2 device comprises a very large number of separate substrates of image detectors, the arrangement of which in the focal plane at precise locations is particularly time consuming. Moreover, the relative positions of some of the substrates can vary unintentionally, thus producing errors of alignment between the images captured by the detectors.

In other imaging devices of different design, the arrangement of separate detectors in different focal planes requires spatially dividing the image formation beam produced by the imaging optics. Such a design with beam division is more complex, because it requires using additional optical components, and the weight as well as the space requirement of the imaging device are increased in consequence.

SUMMARY OF THE INVENTION

Under these conditions, the purpose of the present invention is to provide an imaging device that can be simply adapted for many space observation missions, particularly for unidirectional or bidirectional push-broom scanning mode missions.

Another purpose of the invention consists in providing an imaging device for which the arrangement of the image detectors in the focal plane is simplified and fast to implement.

Yet another purpose is to provide an imaging device having a simpler design, with weight and space requirements which are reduced.

To this end, the present invention proposes an imaging device intended to be placed on board a satellite or an aircraft and which comprises:
    imaging optics, which is suitable for forming an image in a focal plane;
    at least two luminous flux detector arrays, each comprising, separately from the other detector array(s):
        a main detector of the unidirectional type with several parallel rows of first photosensitive elements that are juxtaposed in a row direction, the rows being offset in a column direction perpendicular to the row direction and all extending over the same first length in the row direction, this main detector having a unidirectional row transfer direction parallel to the column direction; and
        at least one additional detector, each comprising at least one row of second photosensitive elements that are juxtaposed parallel to the row direction, each additional detector being suitable for capturing images in motion in the focal plane parallel to the column direction.

The imaging device also comprises:
    for each main detector: a first filter arranged for spectral filtering of the luminous flux reaching the first photosensitive elements of the main detector, with a first spectral transmission window; and
    for each additional detector: a second filter arranged for spectral filtering of the luminous flux reaching the second photosensitive elements of said additional detector, with first and second spectral transmission windows that are different for the same detector array.

According to first features of the imaging device of the invention, the main detector and each additional detector are produced for each detector array separately from the other detector array(s), on one same single-piece substrate which is dedicated to this detector array. Moreover, the row of second photosensitive elements of each additional detector extends in the row direction over a second length which is comprised between 0.9 and 1.1 times the first length, while being offset with respect to the rows of the main detector parallel to the column direction.

Preferably, the first and the second lengths, respectively for the rows of the main detector and each additional detector, are equal to the inside of each detector array.

According to second features of the invention, the respective substrates of the two detector arrays are both arranged in the same focal plane of the imaging optics, and oriented so that their respective column directions are parallel to each other.

Producing the main detector and at least one additional detector for each detector array on the same substrate is made possible by selecting the unidirectional TDI type, i.e. having a single row transfer direction, for the main detector. In this way, it has only a single transfer register, and only a single corresponding array of output connections, so that it has a space requirement compatible with the arrangement of other detectors on the same substrate.

Thus, each detector array is constituted by a separate, stiff detector unit, to be arranged in the focal plane. In this manner, the main detector and the additional detector(s) of the same detector array are fixed relative to one another and have a position relationship that is set during the manufacturing of this detector array. This position relationship is permanent and is not subject to any dispersions that might be introduced during assembly in the focal plane of the imaging optics, nor is it subject to any variations that might subsequently be caused by thermal expansion or by vibration.

Furthermore, because the respective row lengths of the main detector and the additional detector(s) of the same detector array are substantially identical, preferably equal, these detectors are also arranged to be situated within a substantially rectangular perimeter. In this way, the substrate of each detector array can have a simple peripheral shape, in particular rectangular or square, to constitute an image detector module.

Moreover, when the device comprises more than two detector arrays, and at least two of them are also juxtaposed in the focal plane while being offset in the row direction, in order to increase the width of sub-swath, the concordance of the row lengths between the main detector and the additional detector(s) of each detector array simplifies the row-end overlaps to be provided for between said detector arrays. In particular, equal overlap lengths can be provided for the main detectors and for the additional detectors.

The second features of the invention point to the modular organization of the detector arrays within the focal plane. The two detector arrays are arranged in the focal plane with parallel respective column directions. Thus, all the detectors can be simply and quickly placed in the focal plane. They are grouped on separate substrates, each holding a main detector and at least one additional detector, so that arrangement in the focal plane is reduced simply to the positioning and orientation of each substrate.

The design of the imaging device, which may have only one focal plane, is also simplified and makes it possible to reduce the number of optical components. In particular, specific components for spatially dividing the image formation light beams into several optical paths are not required. The weight and space requirements of the imaging device can then be reduced for this reason.

Preferably, the substrates of the two detector arrays may also be arranged in the focal plane so that the respective edge columns of the main detectors of these two detector arrays, which are situated on edges of the main detectors oriented towards one same side of the focal plane, have an offset with respect to each other, measured in the direction of the rows, which is less than 5% of said first length. Even more preferably, said offset may be zero, so that the respective edge columns of the main detectors of the two detector arrays are aligned with respect to each other in the column direction.

Advantageously, the second filters may be identical for two additional detectors, belonging respectively to each one of the two detector arrays. In this case, the respective substrates of the two detector arrays can be connected to provide the additional detector redundancy.

Optionally, each detector array may comprise several additional detectors that are all produced on the substrate of this array while being offset in the column direction. All the additional detectors then comprise each at least one row of second photosensitive elements juxtaposed parallel to the row direction of the detector array, this row further extending over a second length comprised between 0.9 and 1.1 times the first length. In this way, the peripheral shape of each detector array with several additional detectors can also be substantially rectangular, so that the arrangement of the detector arrays in the focal plane remains simplified.

Optionally, for at least one of the detector arrays, the second filters of two additional detectors of this detector array may be identical. This additional detectors can then be connected to provide additional detector redundancy.

Particularly advantageously, all the detector arrays used in one single imaging device according to the invention may be identical. Such similarity relates to the detector arrays that group the detectors into unit modules to be arranged in the focal plane. However, it does not necessarily relate to the filters that are associated respectively and individually with the detectors.

According to a first possibility, the respective substrates of the two detector arrays may also be oriented in the focal plane so that the respective row transfer directions of the main detectors of these two detector arrays are identical.

These first orientation possibility may be adapted to produce stereoscopic imaging. To this end, the substrates of the two detector arrays are arranged so that each one is associated with a different line of sight through the imaging optics. Alternatively, and when the first filters are moreover identical, the respective substrates of the two detector arrays may be arranged and connected to provide the main detector redundancy.

Alternatively, a second possibility consists in orienting the respective substrates of the two detector arrays so that the respective row transfer directions of their main detectors are opposite. This second possibility is compatible with the bidirectional push-broom scanning mode.

Moreover, the filters that are associated respectively with the main detector and the additional detector(s) of each detector array may be adapted so that the main detector constitutes a panchromatic imaging channel and each additional detector constitutes a chromatic imaging channel, i.e. the spectral width of which is smaller than that of the panchromatic channel. To this end, the spectral transmission window of each additional detector filter may be situated within the spectral transmission window of the main detector filter of the same detector array, being much narrower than the latter.

When each detector array comprises at least four additional detectors as well as the main detector, two identical sets each of at least four second filters of additional detectors may be respectively associated with one pair of detector arrays arranged according to the invention. In this case, but non-limitatively, each set of second filters may comprise filters with spectral transmission windows which are separate. Such second filters may be identical for the two detector arrays. Advantageously, the respective first filters of the two main detectors of the detector arrays may also be identical, each with a spectral transmission window that extends between 450 nm and 900 nm.

Still for detector arrays each having at least four additional detectors, and again non-limitatively, eight second filters may be associated respectively with the additional detectors of the two detector arrays. In such other case, the respective first filters of the two main detectors of the detector arrays may respectively have spectral transmission windows that are different.

The invention also proposes a method for producing an imaging device, comprising the following steps:
  providing the two luminous flux detector arrays separately on two single-piece substrates that are dedicated respectively to the two detector arrays;
  providing the imaging optics;
  arranging and orienting the respective substrates of the two detector arrays in the same focal plane of the imaging optics so that their respective column directions are parallel to each other; and
  arranging a first filter for each main detector and a second filter for each additional detector.

The imaging device produced in this way can be according to the above description.

BRIEF DESCRIPTION OF THE DRAWINGS

Other features and advantages of the present invention will become apparent from the following description of non-limitative embodiments, with reference to the attached drawings, in which.

In clarity sake, dimensions of different elements represented in the figures do not correspond either to actual dimensions or to dimensional relationships. Moreover, identical references that are indicated in different figures denote identical elements, or elements with identical functions.

DETAILED DESCRIPTION OF THE DRAWINGS

Figure 1A:
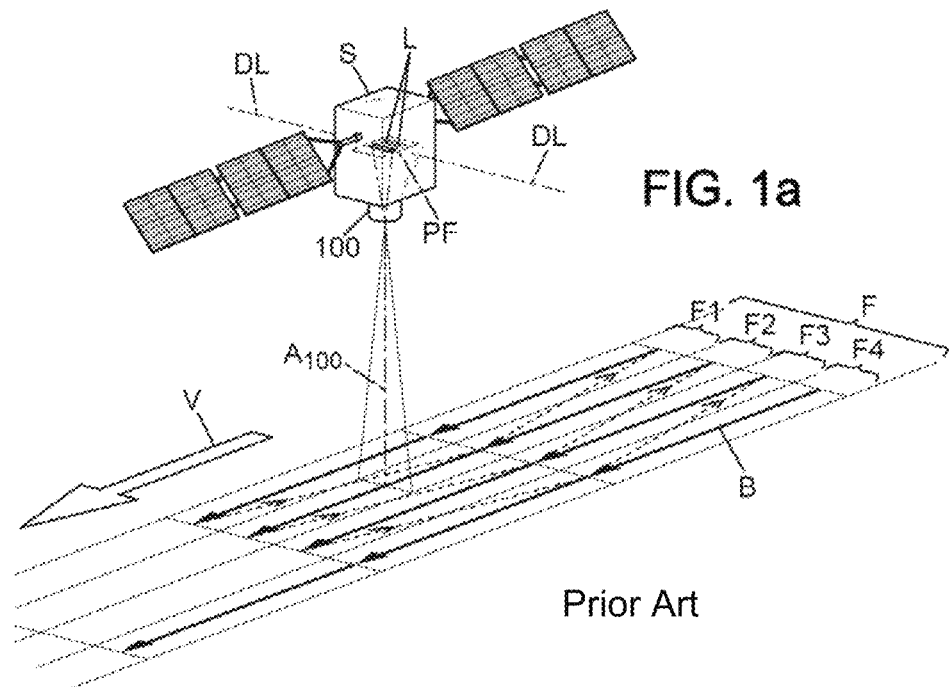
FIGS. 1a and 1b, respectively show two prior art scanning modes that are used for Earth observation carried out from a satellite.
Figure 1B:
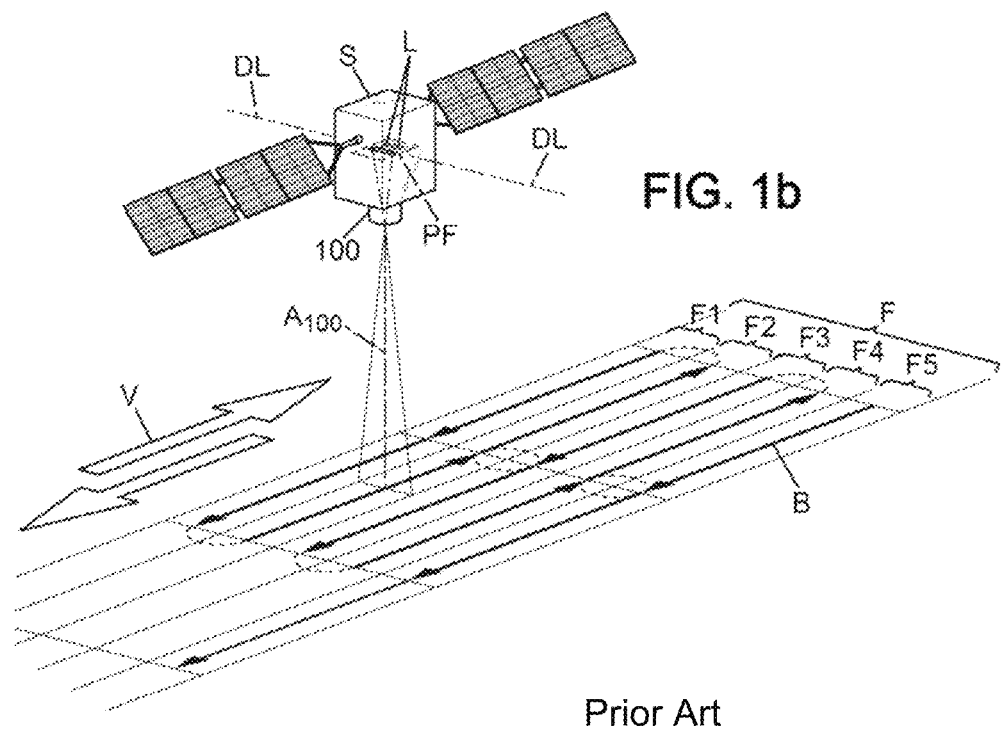
Figure 2:
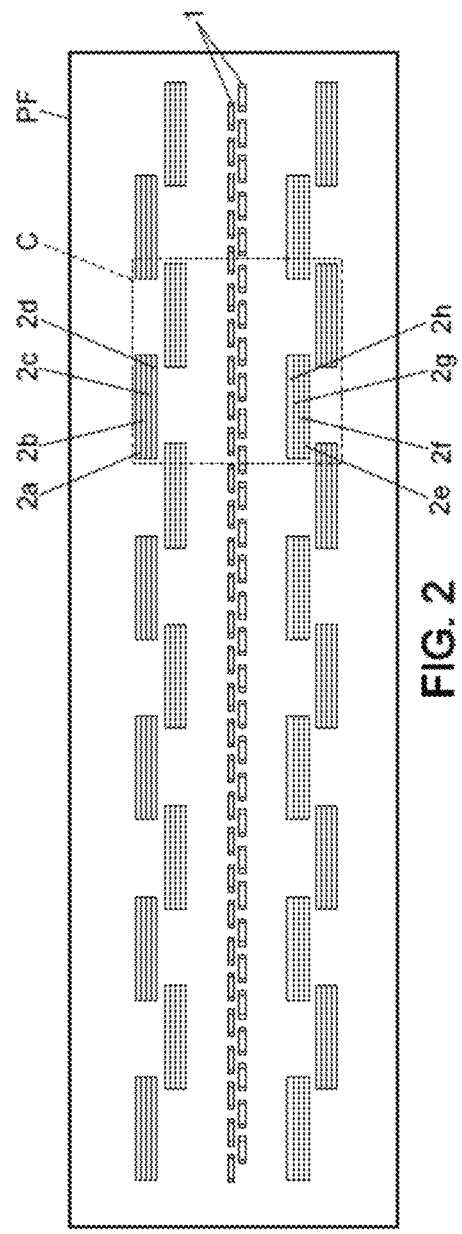
FIG. 2, shows a prior art arrangement for detectors inside a focal plane.

The following description relates to arrangements according to the invention of luminous flux detectors in one same focal plane of an imaging device. It is understood that this imaging device can be used on board a satellite or an aircraft, for conditions and mission objectives that are identical to those described with reference to FIGS. 1a and 1b. The arrangements that are most suitable for the unidirectional push-broom scanning mode in FIG. 1a, and those compatible with the bidirectional push-broom scanning mode in FIG. 1b, will also be indicated.

Generally, the imaging device comprises imaging optics 100 that form an image of a scene in a focal plane PF. All the luminous flux detectors that are considered hereinafter are placed in this focal plane PF, i.e. they are arranged so that the luminous flux collecting surfaces are situated in the plane PF. In a manner that is obvious to a person skilled in the art, the device also comprises all the circuits required for synchronization, control, reading and recording that are needed for the operation of the luminous flux detectors, so these usual circuits are not described again.

The luminous flux detectors are grouped into unit modules 10 that are identical and separate, and these modules 10 are arranged in different ways in the focal plane PF. The modules 10 were previously called detector arrays in the general part of the description. The arrangement of the modules 10 in the focal plane PF is adapted depending on the specificities of each observation mission, including the scanning mode, it being understood that the same model of unit modules can be used with different arrangements. Such a modular arrangement within the focal plane constitutes an essential aspect of the present invention. It results in a significant cost reduction, because the same unit module model is re-used for different observation missions. The alignment of the detectors in relation to each other within the focal plane is also simplified, since it is reduced to the alignment of the unit modules. According to this modular arrangement of the focal plane, three examples of unit modules of detectors will be described below at first with reference to FIGS. 3a to 3c. Then two examples of arrangement of the modules in the focal plane PF are described with reference to FIGS. 4a and 4b. Finally, the chromatic functions of several imaging devices according to the invention are then described.

Generally for the invention, each module 10 comprises a main detector and at least one additional detector. By way of example for all of the remaining description, each module 10 comprises a main detector referenced 1 and four additional detectors referenced 2a-2d.

In all cases, the detector 1 is of the unidirectional type. It comprises a square or rectangular matrix of photosensitive elements 11, with several rows L that are all parallel to the row direction DL. The photosensitive elements 11 are therefore simultaneously aligned in columns that are all parallel to the column direction DC. For its luminous flux detection operation, the main detector 1 needs the image formed by the imaging optics 100 on the photosensitive elements 11 to move parallel to the column direction DC, in a fixed direction called the row transfer direction and marked TL. Thus, the main detector 1 determines by its orientation in the focal plane PF, the direction of scanning of each sub-swath captured by this detector 1. This mode of operation of the main detector 1 makes it possible to obtain high sensitivity for the detection of weak luminous fluxes, despite the image motion with respect to the photosensitive elements 11. Therefore, the elements 11 can have reduced dimensions, to improve the ground sampling distance denoted by GSD. In the following examples, the main detector 1 of each module 10 may be of the time-delayed integration (TDI) type. The same main detector 1 can be used again for the three examples of modules 10 in FIGS. 3a to 3c.

Each additional detector 2a-2d of the module 10 comprises at least one row of photosensitive elements 21, extending parallel to the direction DL. The elements 21 are not necessarily identical to the elements 11. Each additional detector 2a-2d may be of the unidirectional or bidirectional type, but all the additional detectors of a single module 10 are preferably of the same one of said two types. When one of the additional detectors 2a-2d is of the bidirectional type, it is suitable for capturing an image that moves in the focal plane PF parallel to the column direction DC, both in the row transfer direction TL of the main detector 1, itself unidirectional, and in the opposite direction.

Within the module 10, the main detector 1 and the additional detectors 2a-2d are produced on the same stiff substrate dedicated to said module. The detectors 1 and 2a-2d then have relative positions within the module that are fixed and determined during the manufacturing of the module. Thus, each module 10 is a stiff, single-piece component separate from the other modules. When the image formed by the imaging optics 100 moves on the module 10, its direction of motion is identical on all the detectors 1 and 2a-2d. Furthermore, the row direction DL is common to all the detectors 1 and 2a-2d of the module 10, and these detectors advantageously have identical row lengths and positions in the module that are offset in the column direction DC. In this manner all the detectors of the module 10 capture identical along-track portions of the same sub-swath, during the scanning of this sub-swath. The direction of this scanning is imposed by the main detector 1 and, when the additional detectors 2a-2d are also of the unidirectional type, they must be oriented in module 10 to operate in the same row transfer direction TL as the main detector 1.

Figure 3A:
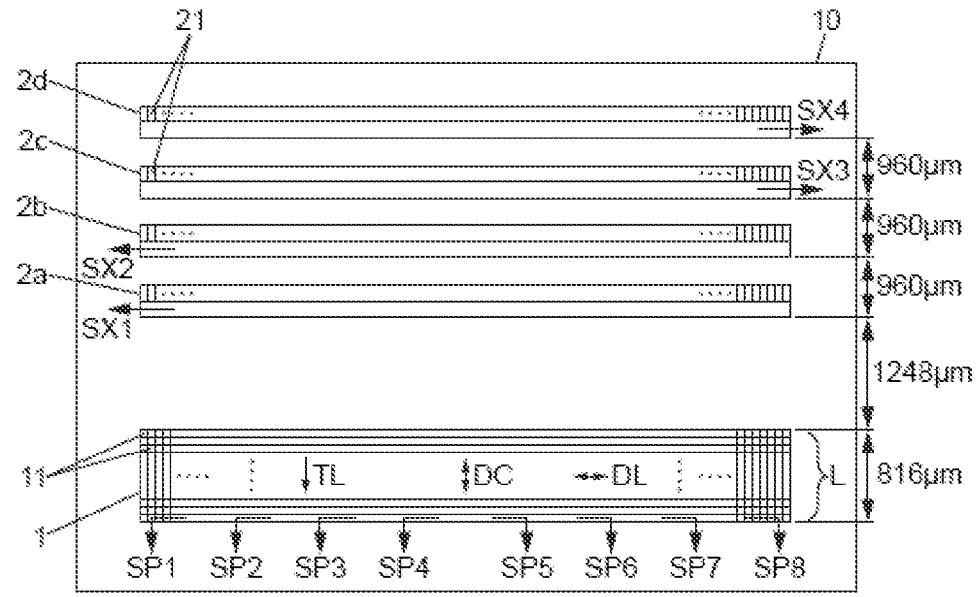
FIGS. 3a to 3c show three examples of luminous flux detector arrays that may be used in embodiments of the invention.

FIG. 3a shows the distribution of the luminous flux collector surfaces of the photosensitive elements 11 and 21 for a first example of module 10. For this first example, the additional detectors 2a-2d are of the bidirectional type, each comprising a single row of photosensitive elements 21. However, the additional detectors 2a-2d may each comprise several rows of elements 21 while still being of the bidirectional type. By way of illustration, the main detector 1, of the TDI type, may comprise approximately 7,000 photosensitive elements 11 per row L. The main detector 1 may have several readout outputs marked SP1 to SP8, which are arranged in parallel in order to read the consecutive row segments simultaneously in the direction DL. The frequency of acquisition of the rows by the whole module 10, which is usually determined by the detector 1, can thus be increased. Each secondary detector 2a-2d may have approximately 3,500 photosensitive elements 21. SX1 to SX4 denote the respective readout outputs of the detectors 2a-2d. Optionally, the results of reading the elements 21 may be added for each separate pair of adjacent elements 21. More generally, the photosensitive elements 11 of the main detector 1 can advantageously have a pitch along the row direction DL that is smaller than that of the photosensitive elements 21 of each additional detector 2a-2d. The module 10 is then suitable for producing images according to the "pan-sharpening" method known to a person skilled in the art. To this end, the additional detectors 2a-2d may be equipped with four chromatic filters, and the main detector 1 may be equipped with a filter having a large spectral transmission window, which may contain those of the filters of the detectors 2a-2d. Throughout the present description, by chromatic filter is meant a filter used for one of the detectors 2a-2d, the spectral transmission window of which is narrower than that of the main detector 1. In contrast to the chromatic filters of the detectors 2a-2d, the filter of the main detector 1 is called panchromatic, although it is possible that one of the chromatic spectral windows is not comprised within the panchromatic spectral window.

Figure 3B:
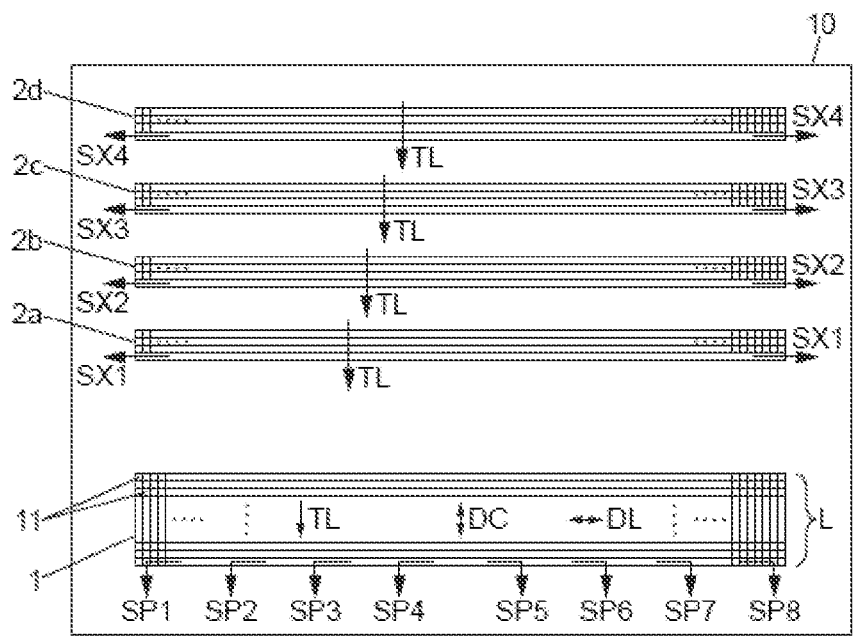

FIG. 3b corresponds to FIG. 3a for a second example of module 10. The additional detectors 2a-2d are now also of the unidirectional type, with several rows of photosensitive elements 21 that are parallel and offset in the column direction DC. In this case, the main detector 1 and the additional detectors 2a-2d have respective row transfer directions TL that are all identical. This row transfer direction is therefore imposed by all the detectors of the module 10, and no longer only by the main detector 1. In particular, the additional detectors 2a-2d may also be of the TDI type, for example each with three rows of TDI stages.

Figure 3C:
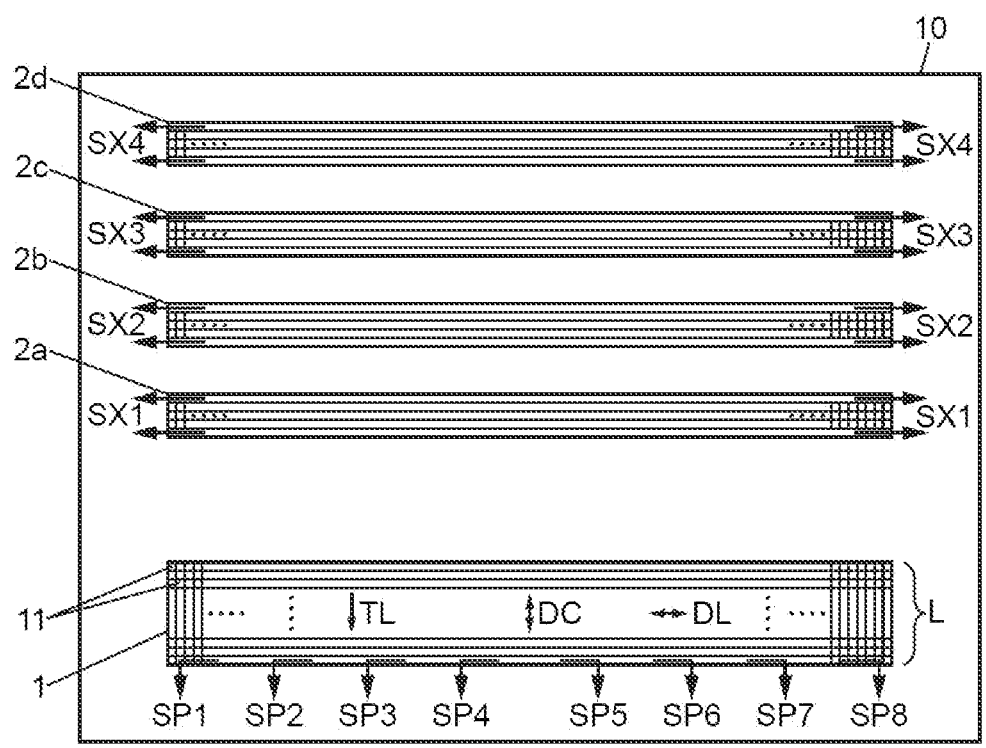

Finally, FIG. 3c also corresponds to FIG. 3a for a third example of module 10, again with additional detectors of the bidirectional type. Each additional detector 2a-2d is now a TDI detector with two opposite row transfer directions. Thus, during image capture by module 10, the charges accumulated by the elements 21 are transferred either in the row transfer direction TL that is defined for the main detector 1, or in the opposite direction, selectively according to the direction of motion of the image to be captured on the module 10.

Generally, all the detectors of the same module 10 may be activated simultaneously when the image is moved in the focal plane PF in the row transfer direction TL of the main detector 1. When the additional detectors 2a-2d are bidirectional (FIGS. 3a and 3c), they can also be activated while the direction of image motion in the focal plane PF is opposite to the row transfer direction TL of the main detector 1. The latter is then disabled.

Figure 4A:
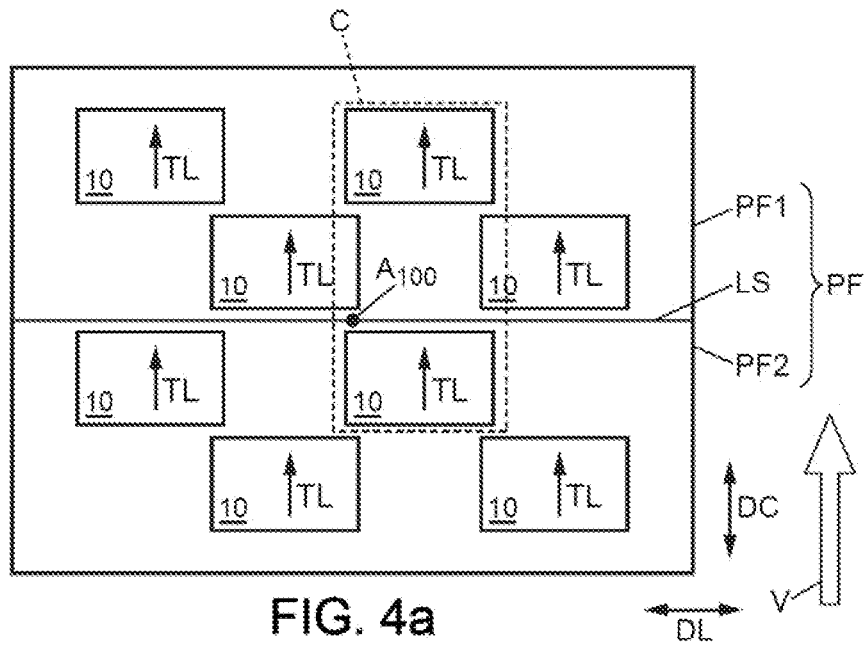
FIGS. 4a and 4b show two possible arrangements of detector arrays for producing an imaging device according to the invention.
Figure 4B:
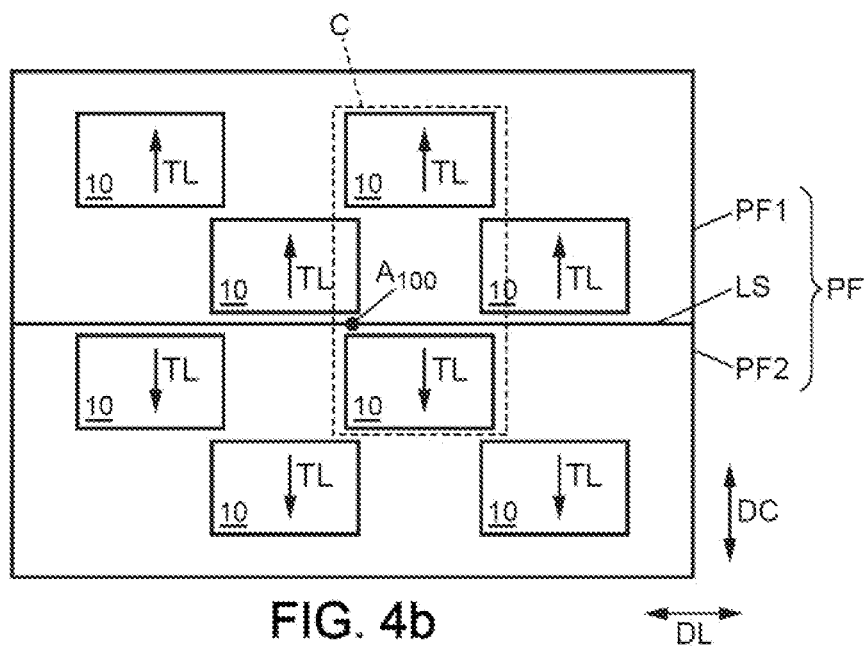

With reference to FIGS. 4a and 4b, several arrangements will now be described for the detector modules 10 in the focal plane PF of the imaging optics 100. FIGS. 4a and 4b each show the focal plane PF, indicating its intersection with the optical axis $A_{100}$ of the imaging optics 100. Except in the case of stereoscopic imaging, it is assumed that the optical axis $A_{100}$ is aligned with the line of sight of the imaging device. The focal plane PF is divided into two complementary half-planes PF1 and PF2, with a rectilinear separation limit LS between them intersecting the optical axis $A_{100}$.

All the modules 10 used for the same imaging device are oriented in the focal plane PF to have the same row direction DL, and therefore also the same column direction DC. In order to capture images in the unidirectional or bidirectional push-broom scanning mode, the imaging device is oriented on board the satellite S so that the column direction DC is parallel to the direction of image motion V in the focal plane PF. As seen in the above description of the modules 10 that are intended to be used in an imaging device according to the invention, the orientation of each module is characterized unequivocally by the orientation of the row transfer direction TL of its main detector 1.

Preferably, all the modules 10 used for the same imaging device are identical to each other.

In each of FIGS. 4a and 4b, the frame C in broken lines denotes the arrangement pattern of the modules 10 in the focal plane PF. The two modules 10 that form this pattern are aligned with respect to each other in the column direction DC. Optionally, an across-track offset between these two modules 10 of the pattern may be implemented in the row direction DL, while remaining less than 5% of the length of the rows L of the main detectors 1. The pattern of the frame C may be repeated several times, for example four times, with successive offsets in the row direction DL, in order to increase the effective width of the sub-swath. During these repetitions, the pattern may simultaneously be offset in the column direction DC, in order to optimize a trade-off between the space requirement between neighbouring modules 10 in the focal plane PF on the one hand, and the concentration of the detectors around the optical axis $A_{100}$ on other hand, in order to reduce the image distortions. Moreover, two successive patterns in the row direction DL are advantageously offset so that the rows of photosensitive elements of the modules have end-of-row overlaps. Such overlaps, which may be of around one hundred photosensitive elements 11, allow easy connection of the image row segments captured by separate modules 10.

In the arrangement in FIG. 4a, the modules 10 are all oriented so that their row transfer directions TL are identical, within the entire focal plane PF. Thus, all the detectors of the modules 10 can be used at the same time, providing that the direction of image motion V in the focal plane PF corresponds to the row transfer direction TL. For such an arrangement, two identical detectors within each pattern may be connected to provide redundancy. Such redundancy makes it possible for one of these detectors to be used instead of the other in the event of failure thereof. To this end, the two detectors concerned are equipped with identical filters. This is so for the two main detectors 1 of modules 10 that are situated at the same level in the row direction DL, or for two additional detectors of these modules. For the additional detectors 2a-2d, such redundancy can thus be obtained between two additional detectors belonging to the same module 10, as well as for two additional detectors belonging to modules 10 that are different but situated at the same level in the row direction DL.

The arrangement in FIG. 4a is suitable for the unidirectional push-broom scanning mode, since there is a single row transfer direction TL. In contrast, such an imaging device is not very suitable for the bidirectional push-broom scanning mode, as it would then be necessary to rotate the device about the optical axis $A_{100}$ between two along-track segments of sub-swath that are covered in opposite directions.

The arrangement in FIG. 4a is also suitable for providing stereoscopic imaging of a scene contained in the object field, with two distinct lines of sight that are simultaneously implemented. In the jargon of a person skilled in the art, such a stereoscopic observation is called "native stereo". To this end, the modules 10 that are contained in the half-plane PF1 are associated through the imaging optics 100 with a first line of sight, and the modules 10 that are contained in the half-plane PF2 are associated, also through the imaging optics 100, with a second line of sight different from the first. Such native stereo imaging systems have already been presented elsewhere and so need not be described again here. It is only reminded that the imaging optics 100 can be combined for this purpose with a beam division system and with systems for determining the two separate lines of sight. Preferably, the division of the image formation light beam is carried out in accordance with the distribution of the modules 10 between the two half-planes PF1 and PF2.

In the arrangement in FIG. 4b, the modules 10 of the same half-plane PF1 or PF2 are all oriented so that their row transfer direction TL is also identical within said half-plane. However, this direction is reversed between the two half-planes PF1 and PF2. Thus, the modules 10 of the half-plane PF1 on the one hand, and those of the half-plane PF2 on the other hand, can be activated alternately, depending on the half-plane for which the row transfer direction TL is identical to the direction of image motion in the focal plane PF. Such an arrangement is particularly suitable for the bidirectional push-broom scanning mode. In this case, the image of each along-track segment of sub-swath is captured with the modules 10 of the one of the two half-planes PF1 and PF2 for which the row transfer direction TL is identical to the direction of image motion in the focal plane PF.

Due to the opposite row transfer directions TL of the main detectors 1 of two modules 10 of the same pattern of arrangement, no main detector redundancy can be obtained. The same applies for the additional detectors 2a-2d when these detectors are also of the unidirectional type, as in the case of the module 10 in FIG. 3b. In contrast, when the additional detectors 2a-2d are of the bidirectional type, i.e. for modules 10 according to one of FIGS. 3a and 3c, additional detector redundancy can be obtained in the same way and under the same conditions as for the arrangement in FIG. 4a.

It is understood that the two arrangements in FIGS. 4a and 4b are valid providing that a complete pattern is produced, as contained in the frame C, even if said pattern is not repeated several times.

Figure 5A:
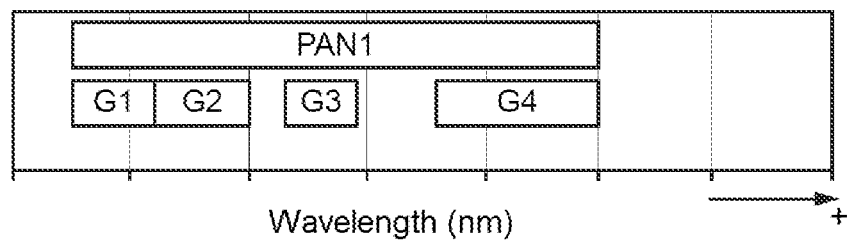
FIGS. 5a and 5b are respective spectral diagrams of two sets of filters that may be used alternately for imaging devices according to the invention.
Figure 5B:
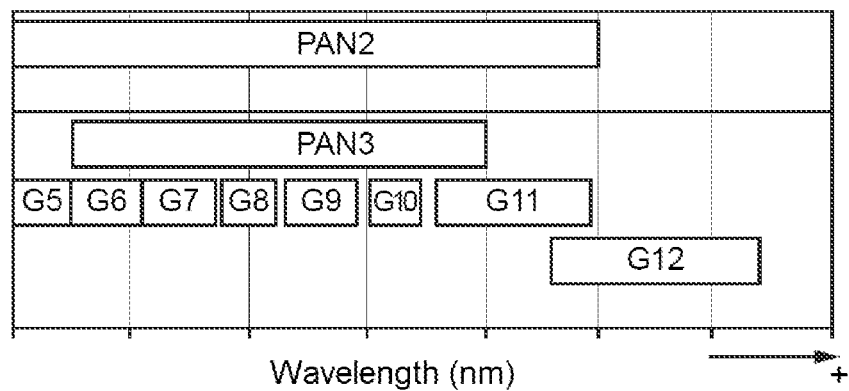

Two sets of filters will now be described that may be used in imaging devices according to the invention, with reference to FIGS. 5a and 5b.

The first set of filters (FIG. 5a) is suitable for providing four chromatic channels and one panchromatic channel. Each filter G1 to G4 is intended to be associated with an additional detector 2a-2d, and the filter PAN1 is intended to be associated with a main detector 1.

The second set of filters (FIG. 5b) is suitable for providing eight chromatic channels and two panchromatic channels. Each filter G5 to G12 is intended to be associated with an additional detector 2a-2d, and each filter PAN2 or PAN3 is intended to be associated with a main detector 1.

Figure 6A:
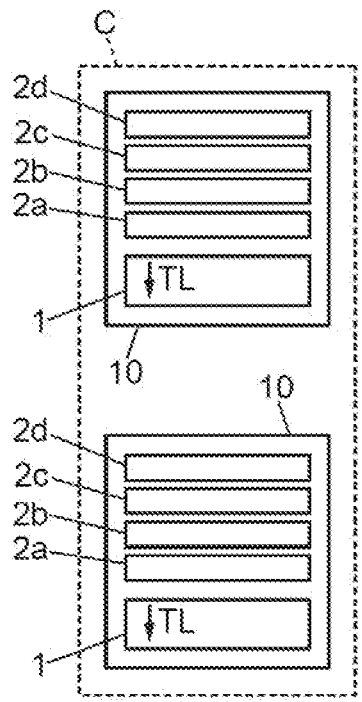
FIGS. 6a and 6b each show three examples of allocation of filters for imaging devices according to the invention.

FIG. 6a shows two possible allocations of the filters of the first set, and an allocation of the filters of the second set, for the pattern of arrangement of two modules 10 in FIG. 4a (frame C in the figure). It is reminded that this pattern is more suitable for the unidirectional push-broom scanning mode, and optionally for native stereo imaging. Channel redundancies are obtained between the two main detectors 1 on the one hand, and for each pair of additional detectors 2a-2d that are provided with identical filters on the other hand. Each of the filter allocations given by way of example is shown by one of the columns in the right-hand part of FIG. 6a, and the filters that are allocated to the different detectors 1 and 2a-2d, are respectively marked at the same levels as the detectors concerned. For the allocation of the first column, i.e. the left-hand column, the additional detector redundancies are implemented between each of the two modules 10. For the allocation of the second column, the additional detector redundancies are implemented within each module 10. Finally, the third column shows the allocation of the ten filters of the second set, without redundancy.

Figure 6B:
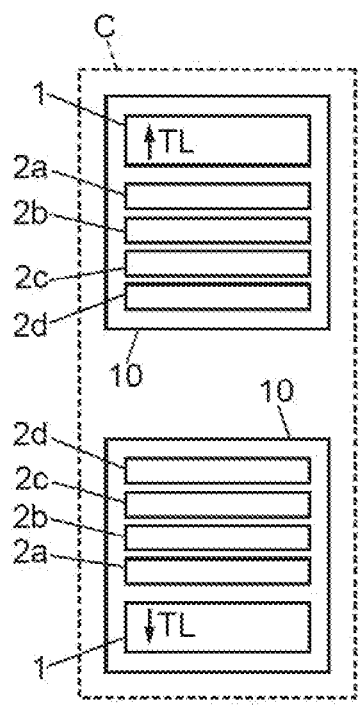

FIG. 6b corresponds to FIG. 6a for the arrangement pattern of two modules 10 of FIG. 4b, more suitable for the bidirectional push-broom scanning mode. The allocation of the first set of filters, which is shown in the first column, does not provide redundancy of additional detectors 2a-2d unless they are bidirectional. In this case, redundancy is obtained between additional detectors 2a-2d that belong respectively to each of the two modules, provided that they are equipped with identical filters. The allocations of the second and third columns do not make it possible to obtain images for all the chromatic filters and for both directions of scanning unless the additional detectors 2a-2d are also bidirectional. In contrast, the allocation of the second column achieves redundancy of the additional detectors that are used for each direction of image motion in the focal plane PF.

It is understood that the present invention can be reproduced while modifying some aspects of the embodiments that have been described in detail, but still retaining at least some of the aforementioned advantages. In particular, the distribution of the modules 10 in two halves of the focal plane PF with a rectilinear separation row LS intersecting the optical axis $A_{100}$ is not essential. Similarly, the positioning of the two modules 10 belonging to the same arrangement pattern at the same level in the row direction DL is not essential either.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. An imaging device to be placed on board a satellite or an aircraft, comprising:
    an imaging optics, suitable for forming an image in a focal plane;
    at least two luminous flux detector arrays, each separately comprising:
        a main detector of the unidirectional type with several parallel rows of first photosensitive elements that are juxtaposed in a row direction, said rows being offset in a column direction perpendicular to the row direction and all extending over the same first length in said row direction, said main detector having a unidirectional row transfer direction parallel to the column direction; and at least one additional detector, each comprising at least one row of second photosensitive elements that are juxtaposed parallel to the row direction, each additional detector being suitable for capturing images in motion in the focal plane parallel to the column direction;

for each main detector, a first filter arranged for spectral filtering of the luminous flux reaching the first photosensitive elements of said main detector, with a first spectral transmission window; and for each additional detector, a second filter arranged for spectral filtering of the luminous flux reaching the second photosensitive elements of said additional detector, with a second spectral transmission window different from the first spectral transmission window for the same detector array, in which, for each detector array separately from the other detector array, the main detector and each additional detector are produced on one same single-piece substrate dedicated to said detector array, with the row of second photosensitive elements extending in the row direction over a second length comprised between 0.9 and 1.1 times the first length, and being offset with respect to the rows of the main detector parallel to the column direction, the respective substrates of the two detector arrays both being arranged in the same focal plane of the imaging optics, and oriented so that the respective column directions of said detector arrays are parallel to each other.

2. The device according to claim 1, in which the substrates of the two detector arrays are also arranged in the focal plane so that respective edge columns of the main detectors of said two detector arrays, situated on edges of said main detectors oriented towards one same side of the focal plane, have an offset between them, measured in the row direction, which is less than 5% of said first length.

3. The device according to claim 2, in which the substrates of the two detector arrays are also arranged in the focal plane so that the respective edge columns of the main detectors of said two detector arrays are aligned with respect to each other in the column direction.

4. The device according to claim 1, in which the detector arrays are identical.

5. The device according to claim 1, in which the respective substrates of the two detector arrays are also oriented in the focal plane so that the respective row transfer directions of the main detectors of said two detector arrays are identical.

6. The device according to claim 5, in which the respective first filters of the main detectors are identical, and the respective substrates of the two detector arrays are arranged and connected to provide main detector redundancy.

7. The device according to claim 5, in which the imaging optics and the detector arrays are arranged to produce stereoscopic imaging, with each detector array associated with a different sight direction through the imaging optics.

8. The device according to claim 1, in which the respective substrates of the two detector arrays are also oriented in the focal plane so that the respective row transfer directions of the main detectors of said two detector arrays are opposite.

9. The device according to claim 1, in which the first photosensitive elements have a pitch smaller than a pitch of the second photosensitive elements in the row direction.

10. The device according to claim 1, in which the main detector of each detector array is of a TDI type.

11. The device according to claim 1, in which at least one additional detector of each detector array is of a bidirectional type, suitable for capturing an image in motion in the focal plane parallel to the column direction, both in the row transfer direction of the main detector and in the opposite direction to said row transfer direction.

12. The device according to claim 11, in which the additional detector of the bidirectional type of each detector array (10) comprises a single row of second photosensitive elements.

13. The device according to claim 11, in which the additional detector of the bidirectional type of each detector array, is of the TDI type having two opposite row transfer directions.

14. The device according to claim 1, in which at least one additional detector of each detector array is also of the unidirectional type, with several parallel rows of second photosensitive elements offset in the column direction, said additional detector of the unidirectional type and the main detector of the same detector array having identical transfer directions.

15. The device according to claim 14, in which the additional detector of each detector array of the unidirectional type, is of the TDI type.

16. The device according to claim 1, in which the second filters are identical for two additional detectors belonging respectively to each of the two detector arrays, and the respective substrates of said two detector arrays are connected to provide additional detector redundancy.

17. The device according to claim 1, in which each detector array comprises several additional detectors produced on the substrate of said detector array, while being offset in the column direction, and each additional detector comprises at least one row of second photosensitive elements juxtaposed parallel to the row direction of said detector array, and extending in said row direction over a second length comprised between 0.9 and 1.1times the first length.

18. The device according to claim 17 in which, for at least one and same of the detector arrays, the second filters of two additional detectors of said detector array are identical, and said additional detectors are connected to provide additional detector redundancy.

19. The device according to claim 17, in which each detector array comprises the main detector and at least four additional detectors.

20. The device according to claim 19, in which two identical sets of at least four second filters of additional detectors each, are respectively associated with the two detector arrays, and in which the respective first filters of the two main detectors of said detector arrays are identical.

21. The device according to claim 19, in which eight second filters are associated respectively with the additional detectors of the two detector arrays, and in which the respective first filters of the main detectors of said two detector arrays respectively have spectral transmission windows that are different.

22. A method for producing an imaging device intended to be placed on board a satellite or an aircraft, comprising the following steps:

providing at least two luminous flux detector arrays, each detector array comprising on a single-piece substrate dedicated to said detector array and separately from the other detector array: wherein
- a main detector of the unidirectional type with several parallel rows of first photosensitive elements that are juxtaposed in a row direction (DL), said rows being offset in a column direction perpendicular to the row direction and all extending over the same first length in said row direction, said main detector having a unidirectional row transfer direction parallel to the column direction; and
- at least one additional detector, each comprising at least one row of second photosensitive elements that are juxtaposed parallel to the row direction, said row of second photosensitive elements extending in the row direction over a second length comprised between 0.9 and 1.1 times the first length, and being offset with respect to the rows of the main detector parallel to the column direction, and each additional detector being suitable for capturing images in motion in the focal plane parallel to the column direction;

providing imaging optics, suitable for forming an image in a focal plane;

arranging and orienting the respective substrates of the two detector arrays (10) in the same focal plane of the imaging optics, so that the respective column directions of said detector arrays are parallel to each other;

arranging for each main detector a first filter for spectral filtering of the luminous flux reaching the first photosensitive elements of said main detector, with a first spectral transmission window; and arranging for each additional filter a second filter for spectral filtering of the luminous flux reaching the second photosensitive elements of said additional detector, with a second spectral transmission window different from said first spectral transmission window, for the same detector array.

23. The method according to claim 22, implemented with the imaging device according to claim 1.

\* \* \* \* \*